(12) United States Patent
Mayer et al.

(10) Patent No.: US 9,242,598 B2
(45) Date of Patent: Jan. 26, 2016

(54) COLOR-ADJUSTABLE RGB-AMBIENT LIGHTING FOR A CUP-HOLDER ARRANGEMENT

(71) Applicant: Audi AG, Ingolstadt (DE)

(72) Inventors: Michael Mayer, Ingolstadt (DE); Marcus Pfeil, Feucht (DE)

(73) Assignee: AUDI AG, Ingolstadt (DE)

( * ) Notice: Subject to any disclaimer, the term of this patent is extended or adjusted under 35 U.S.C. 154(b) by 239 days.

(21) Appl. No.: 13/921,971

(22) Filed: Jun. 19, 2013

(65) Prior Publication Data

US 2013/0342104 A1    Dec. 26, 2013

(30) Foreign Application Priority Data

Jun. 20, 2012    (DE) .......................... 10 2012 012 268

(51) Int. Cl.
  *B60Q 3/02*    (2006.01)
(52) U.S. Cl.
  CPC ............ *B60Q 3/0243* (2013.01); *B60Q 3/0293* (2013.01)
(58) Field of Classification Search
  CPC ............................ B60Q 3/0243; B60Q 3/0293
  See application file for complete search history.

(56) References Cited

U.S. PATENT DOCUMENTS

| 5,283,420 | A | * | 2/1994 | Montalto | 219/432 |
| 5,678,925 | A | * | 10/1997 | Garmaise et al. | 374/157 |
| 5,842,353 | A | * | 12/1998 | Kuo-Liang | 62/190 |
| 6,637,709 | B1 | | 10/2003 | Guenther | |
| 6,835,915 | B2 | | 12/2004 | Timm | |
| 2004/0140304 | A1 | | 7/2004 | Leyendecker | |
| 2007/0180869 | A1 | * | 8/2007 | Geyer | 68/196 |
| 2012/0225170 | A1 | * | 9/2012 | Sonnendorfer | 426/231 |
| 2014/0207088 | A1 | * | 7/2014 | Guo et al. | 604/290 |

FOREIGN PATENT DOCUMENTS

| CN | 2858373 | 1/2007 |
| DE | 100 23 476 | 12/2001 |
| DE | 102008007254 | 8/2008 |
| DE | 20 2011 103497 A1 | 12/2012 |
| EP | 1 468 635 | 4/2003 |
| KR | 2009 0006497 | 7/2009 |
| WO | WO 00/71006 | 11/2000 |

OTHER PUBLICATIONS

Chinese Search Report with respect to counterpart Chinese patent application 201310242856.5.
Translation of Chinese Search Report with respect to counterpart Chinese patent application 201310242856.5.

* cited by examiner

*Primary Examiner* — Jung Kim
(74) *Attorney, Agent, or Firm* — Henry M. Feiereisen LLC.

(57) ABSTRACT

A cup-holder arrangement for a vehicle includes a cup-holder, a lighting unit; and a control unit for controlling a color gradient of the lighting unit as a function of a temperature setting of the cup-holder or of a temperature in or on the cup-holder.

10 Claims, 1 Drawing Sheet

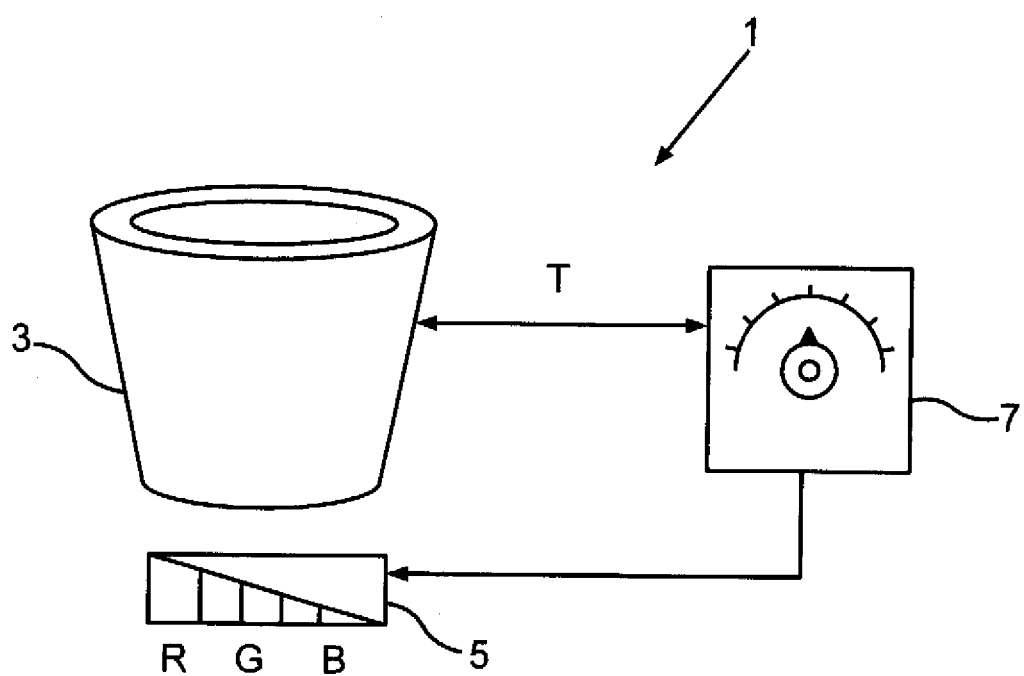

COLOR-ADJUSTABLE RGB-AMBIENT LIGHTING FOR A CUP-HOLDER ARRANGEMENT

CROSS-REFERENCES TO RELATED APPLICATIONS

This application claims the priority of German Patent Application, Serial No. 10 2012 012 268.3, filed Jun. 20, 2012, pursuant to 35 U.S.C. 119(a)-(d), the disclosure of which is incorporated herein by reference.

BACKGROUND OF THE INVENTION

The present invention relates to a color-adjustable RGB-ambient lighting for a cup-holder arrangement and a method for operating such a cup-holder arrangement.

The following discussion of related art is provided to assist the reader in understanding the advantages of the invention, and is not to be construed as an admission that this related art is prior art to this invention.

Ambient lightings, footwell lighting, lit door panels, orientation lighting and lighting of handles of a vehicle are already known for a longer time.

Lightings not only increase comfort in the passenger compartment of a motor vehicle, but also increase driving safety by facilitating orientation and operation inside the vehicle.

Ambient lightings are generally realized as direct light source in form of incandescent lights or LEDs, however, indirect light sources such as light conductors or surface lighting can also be used to realize ambient lighting.

The ambient lighting must not distract or disturb the driver. Through selection of light color, ambient lighting can be used to effect a subjective perception. In addition, the light color is an important design aspect.

Modern vehicles have a multitude of repository systems and storage systems, which for example include ashtrays and cup-holders. Cup-holders have attained special importance because they have become indispensable for long-distance drivers. They generally serve for receiving containers for beverages.

In order to increase the usefulness of cup-holders, early developments involved temperature-adjustable cup-holders. Such cup-holders are capable to cool or heat beverages received therein. In addition, such temperature-adjustable cup-holders meet the high standard of the premium vehicle market. In the future, with such features a user can enjoy his drive with well temperated beverages more comfortably and more relaxed. The trend regarding the passenger compartment of vehicles is toward individualization and a feel-good atmosphere: "feel at home while on the road". However, many of the proposed solutions of temperature-adjustable cup-holders can still be optimized with regard to their energy consumption and their efficiency.

The printed publication WO 00/71006 A1 discloses a "coffee maker" with a hot-water processor, which has a thermostat arranged in a hot-water container, wherein the hot-water processor is capable to qualitatively indicate a hot-water temperature. By means of a green lamp, the reaching of a defined temperature is signaled, wherein a red lamp lights up as soon as this temperature is fallen below. Further, a cup-holder is provided in order to receive a container for the heated water or respectively the water, which has been processed in the hot-water processor.

A further example shown in the printed publication DE 2008 007 254 A1 is a beverage container, in particular for receiving coffee, into which beverage container steam is conducted under high pressure through a coffee filter. The functionality corresponds to a conventional espresso machine. The collection container for the condensed steam or respectively the coffee simultaneously serves as cup for consumption of the coffee prepared therewith. Beside control switches for the coffee machine, display elements are provided, for example LEDs which indicate an operational condition of or a permission to operate the coffee machine, in particular in dependence on a capacity of an electric system of the vehicle.

It would therefore be desirable and advantageous to provide invention to provide a cup-holder arrangement for a vehicle, which enables an easy use.

SUMMARY OF THE INVENTION

According to one aspect of the present invention, a cup-holder arrangement for a vehicle includes a cup-holder; a lighting unit; and a control unit for controlling a color gradient of the lighting unit as a function of a temperature setting of the cup-holder or of a temperature in or on the cup-holder. Such a cup-holder arrangement has the particular advantage that it not only enables the user to set a desired temperature in or on the cup-holder but also informs the user how high or low a current temperature is; The cup-holder arrangement can display the amount of residual heat of the cup-holder and can thereby avoid injury to the user from the hot surface of a heatable container receptacle of the cup-holder.

According to another advantageous feature of the invention, the temperature is an absolute temperature, which corresponds to a target temperature of the cup-holder or an actual temperature in or on the cup-holder. The target temperature of the cup-holder generally is a predetermined temperature value set by a user in order to cause the cup-holder to heat up a container situated in the cup-holder to a predetermined temperature and to display the same. A further application is the display of the respective actual temperature in or on the cup-holder by means of which the user can easily recognize whether for example the content located in the cup-holder his ready for consumption. A still further advantageous application is the display of the residual heat of the cup-holder, whereby a user of the cup-holder can be cautioned regarding possible injury.

According to another advantageous feature of the invention, the temperature is a relative temperature, corresponding to a difference between the target temperature of the cup-holder, and the actual temperature in or on the cup-holder. The display of the relative temperature enables indicating to the user for example whether the content, or respectively the container contained in the cup-holder, has reached a defined temperature or is about to heat up or to cool down. This allows the user to more easily and more accurately set a desired temperature in/on the cup-holder.

According to another advantageous feature of the invention, a light wavelength and/or light intensity of the lighting unit can be controlled in dependence on the temperature of the container in the cup-holder. A change of a light wavelength for example from red to blue or a variation of the light intensity from dimmed light to bright light allows to visually provide a user with a subjective feel for or a subjective assessment of the temperature in the cup-holder.

According to another advantageous feature of the invention, the cup-holder can be an actively temperature-adjustable cup-holder for heating and/or cooling of containers and/or the content contained therein. Such cup-holder arrangements not only allow the user to recognize the temperature in the cup-holder or to what extent the temperature of the container or the content contained therein has changed, but to also intervene in a targeted manner in order to further increase or lower the temperature. Current temperature-controlled cup-holders take advantage of electronically controlled Peltier-technology in which depending on the polarity of the applied voltage the container of the cup-holder is cooled or heated.

When a cup-holder is present in the immediate field of vision of the user, it is particularly advantageous when the lighting unit is integrated in the cup-holder itself. In this way, it can immediately be recognized whether the content in the cup-holder has reached the desired temperature and is ready for consumption. In the case that the cup-holder is not located in the immediate field of vision of the user, it is more advantageous when a display by means of a lighting unit, for example separate from the cup-holder, is provided in or on a display on a dashboard.

According to another advantageous feature of the invention, the lighting unit can be configured for an RGB-lighting. This allows suggesting a subjective temperature perception to the user particularly easily, for example by assigning the color value "red" to a hot temperature value and assigning the color value "blue" to a colder temperature value which deviates therefrom. By means of such a "mental" support, the safety when using such a cup-holder is increased because a user is not forced to resort to sampling or feeling to determine whether or not the temperature that was set by him is already established.

According to another advantageous feature of the invention, the control unit can be integrated in the cup-holder. Such cup-holders can be retrofitted particularly easily because no central control unit has to be connected for its use/control.

According to another advantageous feature of the invention, the cup-holder arrangement can be configured so that the control unit can be activated or adjusted via a human machine interface. In current vehicles, such interfaces are of course already broadly accepted. Their functionality is intuitive to the users. Thus, the integration of the control unit of the cup-holder can be realized via such a human-machine interface. This allows the user to control the temperature of the cup-holder in a conventional manner. This in turn not only facilitates the setting of the desired temperature but also increases the driving safety when operating the cup-holder.

According to another aspect of the present invention, a method for operating the cup-holder arrangement, includes controlling a light wavelength and/or light intensity of a color gradient of a lighting unit of the cup-holder arrangement as a function of a temperature setting of a cup-holder of the cup-holder arrangement or of a temperature in or on the cup-holder with of a control unit which is assigned to the cup-holder.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows schematically the elements of a cup-holder arrangement and their interaction.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there are shown schematically the elements of a cup-holder arrangement and their interaction.

The schematic representation of a cup-holder arrangement 1 for a vehicle illustrated in FIG. 1 shows a cup-holder 3, which is connected to a control unit 7. On or respectively in the cup-holder 3, a temperature T is measured, by means of which the control unit 7 which is connected to the cup-holder 3 adjusts the energy supply for cooling or heating the container or the content which is received in the cup-holder 3.

The cup-holder 3, which is symbolically shown in FIG. 1, can for example be arranged in the center console of the vehicle. In addition, the cup-holder 3 according to the invention is configured in a preferred embodiment so that it can be compactly arranged together with its elements—control unit 7 and lighting unit 5—freely within the passenger compartment. For this, only a connection to an energy source—here not shown—is required in order to enable operation of the cup-holder arrangement 1 according to the invention. In this way, a simple cup-holder arrangement 1 can easily be retrofitted and maintained.

The control unit 7 is further connected with a lighting unit 5, by means of which individual light sources, for example diodes, are controlled in dependence on a temperature T of the cup-holder 3. In addition, it is possible to also change the light wavelength and/or light intensity of this lighting unit 5 or diodes in dependence on the temperature T of the cup-holder 3. The lighting unit 5 can be varied in its shape and selection of the light sources. In a preferred embodiment, the lighting unit 5 has multiple diodes arranged adjacent one another which have a color gradient from red R to green G to blue B by way of the color gradient from red R—wherein the color value red R corresponds to a high temperature T—up to the color value blue B—wherein the color value blue B corresponds to a low temperature, it is possible to easily suggest a feeling to the user for the temperature set by him or for the temperature T that is established in the cup-holder 3. Accordingly, for example a particularly high temperature value T would be assigned a bright light intensity. In a further here not shown embodiment, the individual light sources are configured in different dimensions/sizes.

It is particularly useful, when the lighting unit 5 is arranged in immediate proximity of the cup-holder or in/on the cup-holder 3 itself. This avoids mistaken interpretation with regard to control units different therefrom or displays within the passenger compartment. If a separate arrangement of the lighting unit 5 is required, the lighting unit 5 is integrated into the multifunctional display according to another exemplary embodiment—here not shown.

By means of the lighting unit 5, a desired temperature T that was set by the user can be displayed to the user, wherein for example a defined light source is caused by the control unit to light up in a defined color value R, G or B when the desired temperature T is reached. Further, by means of the lighting unit 7 it can be read off how far a cooling or heating up of the container or its content that is located in the cup-holder 3 has progressed. Thus, the cup-holder 3 according to the invention with its lighting unit 5 is capable to display relative temperatures T which correspond to a difference between a target temperature T of the cup-holder 3 and an actual temperature T in or on the cup-holder 3 to the user in an intuitive manner.

A further aspect of this embodiment enables a user to recognize a residual hot temperature T and prevents him from potentially injuring himself on the cup-holder 3.

In a preferred embodiment of the invention, the desired temperature T is set by the user via a human-machine interface in the passenger compartment of the vehicle and transmitted to the control unit 7. In an embodiment of the cup-holder arrangement 1, in which the cup-holder 3 is configured compact and independent, the desired temperature T can be set directly on the cup-holder 3.

Cup-holder arrangements 1 as shown above thus contribute to the comfort in the vehicle and at the same time improve the safety of the user during driving.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A cup-holder arrangement for a vehicle, comprising:
   a cup-holder;
   a lighting unit; and
   a control unit for controlling a color gradient of the lighting unit as a function of a temperature setting of the cup-holder or of a temperature in or on the cup-holder.

2. The cup-holder arrangement of claim 1, wherein the temperature is an absolute temperature which corresponds to a target-temperature of the cup-holder or to an actual temperature in or on the cup-holder.

3. The cup-holder arrangement of claim 1, wherein the temperature is a relative temperature, which corresponds to a temperature difference between the target-temperature of the cup-holder and the actual temperature in or on the cup-holder.

4. The cup-holder arrangement of claim 1, wherein the control unit is constructed for controlling a light wavelength and/or a light intensity of the lighting unit as a function of a temperature of a container arranged in the cup-holder.

5. The cup-holder arrangement of claim 1, wherein the cup-holder is constructed as a temperature-adjustable cup-holder for heating and/or cooling of containers in the cup-holder.

6. The cup-holder arrangement of claim 1, wherein the lighting unit is integrated into the cup-holder.

7. The cup-holder arrangement of claim 1, wherein the lighting unit is configured as an RGB-lighting.

8. The cup-holder arrangement of claim 1, wherein the control unit is integrated in the cup-holder.

9. The cup-holder arrangement of claim 1, further comprising a human-machine interface for activating or setting the control unit.

10. A method for operating a cup-holder arrangement comprising:
   controlling a light wavelength and/or light intensity of a color gradient of a lighting unit of the cup-holder arrangement as a function of a temperature setting of a cup-holder of the cup-holder arrangement or of a temperature in or on the cup-holder with of a control unit which is assigned to the cup-holder.

* * * * *